United States Patent
Pitchumani et al.

(10) Patent No.: US 9,361,937 B2
(45) Date of Patent: Jun. 7, 2016

(54) SHINGLED MAGNETIC RECORDING DATA STORE

(71) Applicant: SEAGATE TECHNOLOGY LLC, Cupertino, CA (US)

(72) Inventors: Rekha Pitchumani, Los Gatos, CA (US); James Hughes, Palo Alto, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/469,486

(22) Filed: Aug. 26, 2014

(65) Prior Publication Data

US 2016/0064030 A1 Mar. 3, 2016

(51) Int. Cl.
*G11B 5/012* (2006.01)
*G11B 20/12* (2006.01)

(52) U.S. Cl.
CPC .... *G11B 20/1217* (2013.01); *G11B 2020/1238* (2013.01); *G11B 2020/1257* (2013.01)

(58) Field of Classification Search
None
See application file for complete search history.

(56) References Cited

U.S. PATENT DOCUMENTS

| 8,788,506 B1* | 7/2014 | Dornbach | G06F 17/30864 707/747 |
| 2003/0084372 A1* | 5/2003 | Mock | G06F 11/1402 714/15 |
| 2013/0031306 A1* | 1/2013 | Kim | G06F 12/0862 711/113 |
| 2013/0042052 A1* | 2/2013 | Colgrove | G06F 3/0608 711/103 |
| 2013/0275656 A1* | 10/2013 | Talagala | G06F 12/0246 711/103 |
| 2014/0013112 A1* | 1/2014 | Cidon | G06F 21/6218 713/165 |
| 2014/0019680 A1* | 1/2014 | Jin | G11B 5/012 711/112 |
| 2014/0046909 A1* | 2/2014 | Patiejunas | G06F 17/30289 707/687 |

OTHER PUBLICATIONS

Feldman, et al., "Shingled Magnetic Recording—Areal Density Increase Requires New Data Management", www.usenix.org, Jun. 2013, vol. 38, No. 3., pp. 22-30, https://www.cs.cmu.edu/~garth/papers/05_feldman_022-030_final.pdf.

* cited by examiner

*Primary Examiner* — Peter Vincent Agustin
(74) *Attorney, Agent, or Firm* — HolzerIPLaw, PC

(57) ABSTRACT

Implementations disclosed herein provide a method comprising storing data in a two level key-value data store in an SMR storage device, wherein a first level of the data store comprises a journal of incoming host operations and a second level of the data store comprises a plurality of ordered data stores, ordered based on a predetermined ordering criterion.

20 Claims, 7 Drawing Sheets

SHINGLED MAGNETIC RECORDING DATA STORE

BACKGROUND

Shingled magnetic recording (SMR) employs a shingled write process that overlaps sequentially writable, consecutive data tracks on the disk surface like shingles on a roof, thus increasing cell density. Due to the design of SMR, random writes and in-place data updates are not possible in SMR disks because a write to a track may overwrite and destroy data on tracks that it overlaps.

SUMMARY

In one implementation, this disclosure provides a method comprising storing data in a two level key-value data store in an SMR storage device, wherein a first level of the data store comprises a journal of incoming host operations and a second level of the data store comprises a plurality of ordered data stores ordered based on a predetermined ordering criterion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

User data may be stored on disks managed by block-based file systems with an underlying assumption that these blocks are independently updatable units. Because SMR forces tracks to be written sequentially, data placement schemes designed for non-shingled disks may not work for shingled disks. Due to the sequential write nature of the SMR disks, databases for SMR disks need to write to the disk sequentially. Many applications also require the contents of a database to be ordered to ensure fast and efficient range reads. However, many data stores either do not keep data strictly ordered or do not reorder data. Keeping data strictly ordered can cause a major bottleneck in SMR disks, specifically when the size of a SMR band is big, as reordering the data in big bands leads to higher costs.

The present disclosure is directed to a method of storing data in multiple stores and periodically merging the stores to create bigger, reordered stores, which results in good write performance and good read performance (including range reads). Specifically, a method and system including a two-level KV data store for SMR disks is disclosed, where each level may comprise of one or more SMR bands. In an example implementation, each SMR band has its own mapping for each KV in that band. The technology disclosed may be a drive-managed or a host-managed solution.

The first level bands of the two-level KV data store contain journals of incoming writes and deletes. The first level journaling ensures good write performance and sufficient data accumulation resulting in meaningful reordering. The second level bands of the two-level KV data store together form a single ordered data store comprised of many smaller data stores, each belonging to an SMR band and roughly partitioned by the existing key-space range. The second level ordering ensures fast and efficient range read performance, while the reordering overhead is kept in check via the selective reordering based on sequentiality estimation.

As the number of bands in the first level reaches a certain threshold, one or more first level bands are merged (or compacted) with one or more second level bands to form newly ordered second level bands. In one implementation, an equi-depth histogram may be used to estimate the sequentiality of a second level band, and only those bands estimated to require a higher level of reordering are selected for the merge process.

Figure 1:
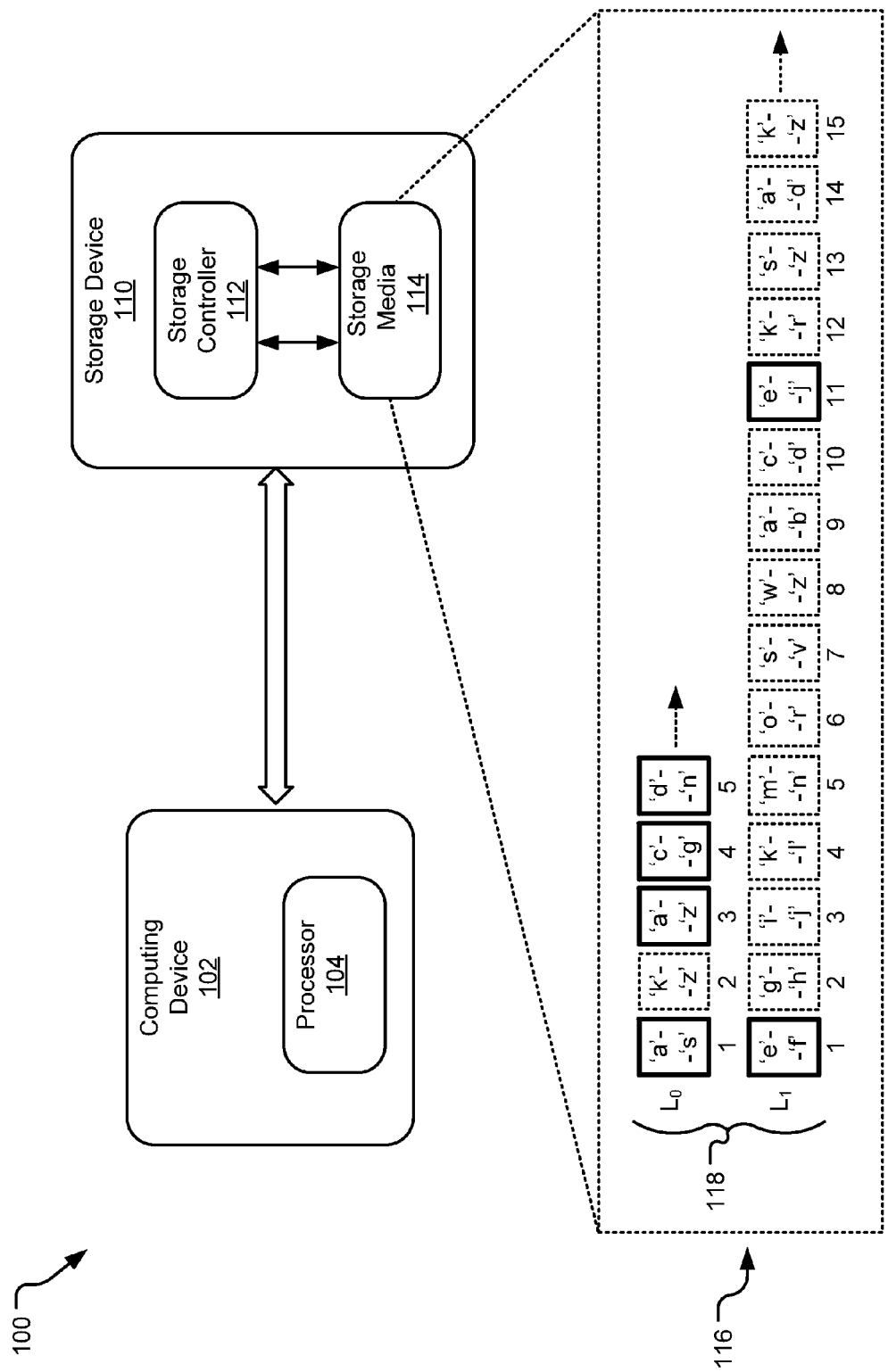
FIG. 1 illustrates a block diagram of an example SMR storage device system.

FIG. 1 illustrates a block diagram of an example data storage system 100, showing the various functional components used to control the operation of a data storage device 110 (e.g., an SMR HDD, an SMR SSHD, an object storage device, etc.). The system 100 includes a computing or host device 102 (e.g., a computer, a mobile device, the internet, etc.) operably connected to the data storage device 110, each of the host device 102 and the storage device 110 communicating with each other.

A processor 104 is located in the host device 102. The processor 104 sends one or more read or write commands to a disk drive storage controller 112 for execution. As control communication paths are provided between a host device 102 and the disk drive storage controller 112, the disk drive storage controller 112 provides communication and control for the data storage device 110.

A storage media 114 located in the data storage device 110 may be one or more of a variety of tangible media (excluding carrier waves and communication signals), including hard disc drives and solid state hybrid drives, storage data on magnetic media, as well as optical media, solid state media such as NAND, NVRAM, Resistive RAM (ReRAM), Magnetic RAM (MRAM), Phase Change Memory (PCM), and other advanced and staid memory technologies.

A data store may be located on the storage media 114. The disclosed technology may split disk space into fixed sized shingled bands and use a small amount of random access space to store the shingled band metadata. KV pairs may be stored in the shingled bands, and the KV pairs in a band may be sorted to aid range reads. In one implementation, each band contains a bloom filter (BF) that stores all the keys stored in the band, and an index is stored at the end of the band together with the band's contents. As shown in detail in an exploded view 116, an example two-level KV store 118 is illustrated (and discussed in further detail in FIG. 3).

The KV store 118 includes two levels $L_0$ and $L_1$. Specifically, $L_0$ includes 5 bands and level $L_1$ includes 15 bands. In the illustrated implementation, a key starting with 'e' may be stored in any of the 6 bands shown as bolded (bands 1, 3, 4, and 5 in level $L_0$ and bands 1 and 11 in level $L_1$).

Figure 2:
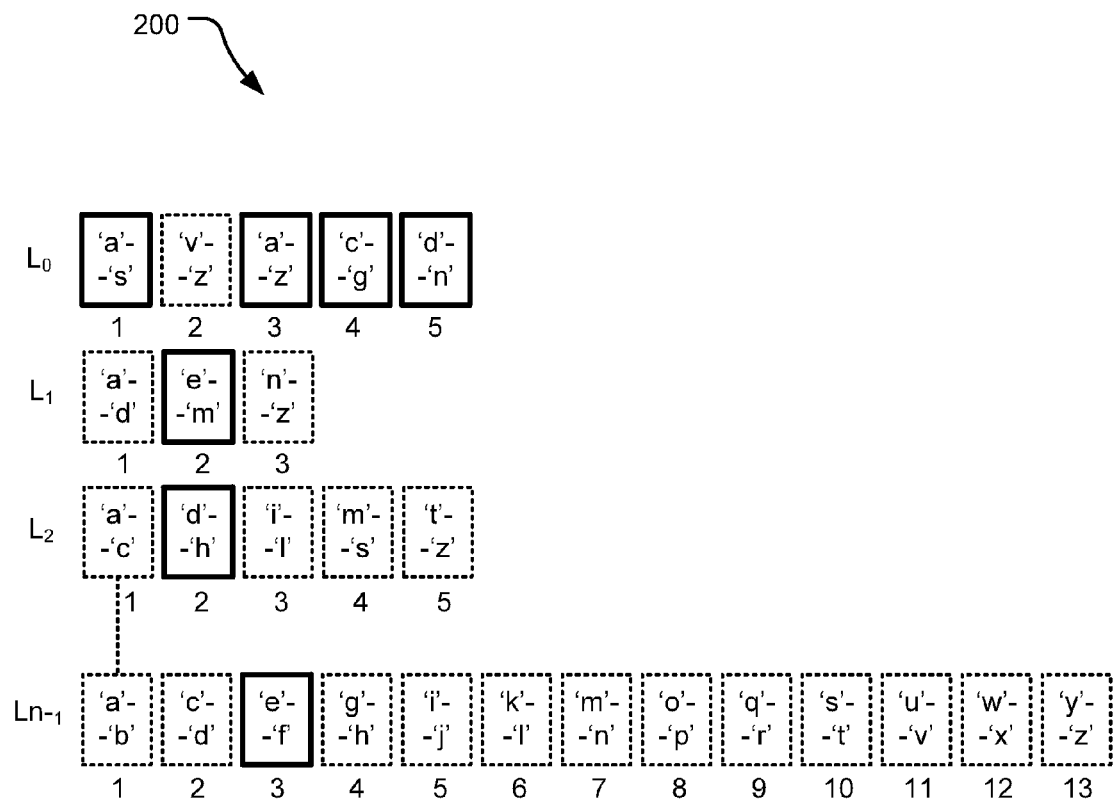
FIG. 2 illustrates an example band organization scheme.

As shown in FIG. 2, an example multi-level band organization scheme 200 organizes bands into multiple levels (more than two levels). The key range covered by each $L_0$ band may overlap with each other. In the illustrated implementation, each of the levels ($L_1, L_2 \ldots, L_{n-1}$) has a size threshold and is increasingly bigger than the previous level. The bands in the levels ($L_1, L_2 \ldots, L_{n-1}$) also have a non-overlapping key range with respect to the other bands in the same level. Thus, when a key has to be read, the maximum number of bands that needs to be searched is the number of $L_0$ bands+the number of non-zero levels. A key starting with 'e' for example, could be in any one of the 7 bands marked with a bolded border in FIG. 2 (e.g., bands 1, 3, 4, and 5 in $L_0$, band 2 in $L_1$, band 2 in $L_2$, and band 3 in $L_{n-1}$.).

Periodically, selected bands in neighboring levels (e.g., $L_1$ and $L_2$) are compacted (or merged) to form new bands in the higher level (e.g., level $L_2$), to rearrange the KV pairs in order and to free up the space used by invalidated KV pairs. Compactions clean invalidated data and strive to keep an entire disk's contents ordered, albeit split into multiple bands, with physical ordering within a band and logical ordering across bands. To achieve this state, the bands may be organized into levels.

When a band is chosen for compaction, all the bands in the selected level and in the next level whose key ranges overlap the selected band's key range also gets compacted. The non-overlap key range requirement reduces the number of bands that needs to be searched during a read, but increases the number of bands that gets selected for compaction in the next level. This may result in copying bands without any major reordering of its contents. Compactions enable higher scan performance, but decrease the insert performance.

For example, if a band selected for compaction in a level covered the key range a-d (e.g., band 1 in $L_1$), but had only 1 key in the range d-j, all bands in the next level that overlap the range a-d, including the band with the d-j range would be selected for compaction and read and rewritten, though only one key is inserted to the d-j range. Compactions can increase the read and write amplification, and affect the incoming read/write performance tremendously. Such organization and compaction, as illustrated in FIG. 2, combined with big band sizes, increases amplification more than needed.

The multi-level organization scheme in FIG. 2 pushes older data down (to higher levels), decreasing the amount of data that gets selected for a compaction run at any given level. However, if a new version of data that is currently in a lower level is inserted, it has to be copied multiple times and has to travel down each level through multiple compaction runs to finally free up the dead space. Though the amount of data that the initial compaction runs have to read and write might be lowered, it ultimately increases the amount of data reads and writes that is required to keep them all ordered.

The technology disclosed herein introduces an artificial slowdown factor, by which the inserts are slowed down if it is determined that a compaction needs to be scheduled, to give the compactions more time to complete. Preference for either current random insert or future scan performance can be shown by controlling this slowdown factor and compaction triggers.

Figure 3:
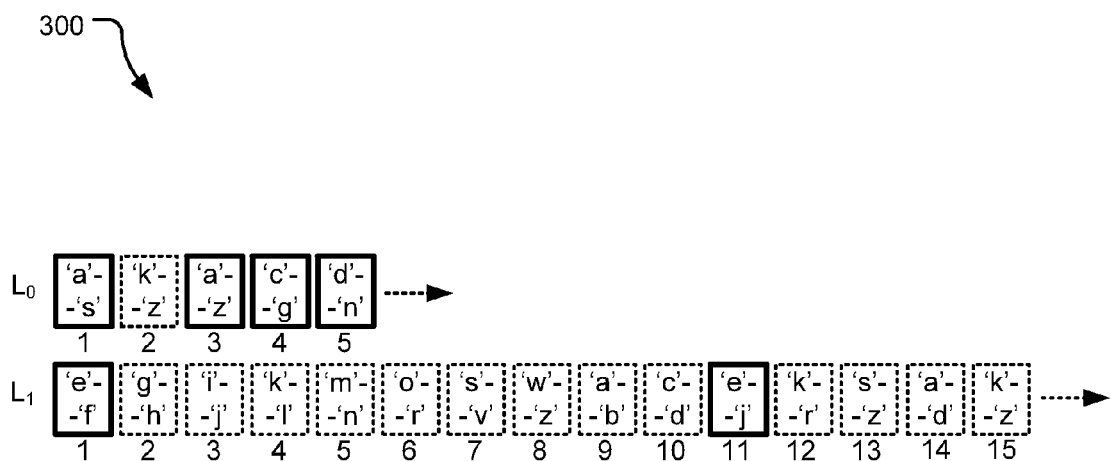
FIG. 3 illustrates a second example band organization scheme.

FIG. 3 depicts another implementation of a multi-level band organization scheme 300 representing the disclosed two-level KV store system and method (similar to the KV store 118 in FIG. 1). As shown, the organization scheme 300 only has two levels ($L_0$ and $L_1$) and the bands in both levels can have overlapping key ranges. The first level, $L_0$, comprises a journal of incoming host operations. The second level, $L_1$, comprises a plurality of ordered data stores ordered based on a predetermined ordering criterion.

In one implementation, efforts are made to keep all the $L_1$ bands ordered with no overlapping key ranges, but this rule is not strictly enforced. By removing the strict no-overlap rule for $L_1$, bands may be selected for compaction based on the cost it would incur vs. the benefit the selection provides. To avoid affecting range reads, sequential access based benefit points for the bands may be assigned. As a result, the strict upper bound on the number of bloom filters (BFs) that needs to be searched to read a value is removed. The compaction scheme strives to keep the number of BFs to be searched low.

A user-initiated manual compaction run may result in total cleanup and complete re-ordering of KV pairs, without any overlapping key range across bands. The regular background compactions select all overlapping bands in a selected key range and prune them to result in a smaller set of bands to merge, even if the pruning results in multiple bands with overlapping key ranges. To aid pruning, a predetermined ordering criterion may be used, wherein such predetermined ordering criterion includes a sequentiality metric for each band. The sequentiality metric measures how ordered a particular band already is, with respect to all the KV pairs stored in the entire database. If the entire contents were reordered and a particular band's contents are unaffected by this reordering, that particular band is determined to have the highest sequentiality score.

In one implementation, the disclosed technology builds an equi-depth histogram (not shown) for each band, to estimate the sequentiality of a band. In contrast to regular histograms with fixed bucket boundaries, an equi-depth histogram determines the bucket boundaries by keeping the number of values in each bucket equal, and has traditionally been used in database systems to perform query size estimation. The purpose is to specifically measure which sub-ranges hold the most data, and which do not, instead of just relying on the end values of the entire range. An equi-depth histogram based merely on the number of KV pairs in a sub range will not take into account the size of the KV pairs. In order to avoid unnecessary reads and writes, an implementation of the histogram is built based on the data size, and determines the key sub-ranges, while keeping the byte size count equal in each sub-range. The chosen byte size determines the size of histogram metadata. Smaller sizes would result in more metadata and better estimation, but would require more memory utilization.

In one implementation, if a newer $L_0$ band is selected for compaction, all older bands with overlapping key ranges in the level $L_0$ have to be chosen as well. For example, in FIG. 3, the band 5 is newer than band 4, which is newer than 3, etc. If band 5 is selected, then band 4 has to be selected as well, as read expects the most recent value to be in the higher level and within a level, in the most recent band. Therefore, band 5 cannot be chosen without choosing bands 4, 3, 2, and 1, while band 1 can be chosen without the rest. However, it may not be desirable to copy older data to a new level when a newer value exists. The disclosed technology chooses the oldest band and all the overlapping bands, up to a set threshold number of bands. If the selection resulted in only one $L_0$ band and the $L_1$ selection also turned out to be empty, the file is just assigned to $L_1$ without an actual copy.

The $L_1$ band selection minimizes the number of bands with overlapping key ranges, but does not trigger too many unnecessary band reads and writes. For a $L_0$-to-$L_1$ compaction, the disclosed technology first selects all $L_1$ bands that overlap the selected $L_0$ bands. For example, if band 1 from the $L_0$ bands is selected, then all $L_1$ bands except band 8 are pre-selected. If a pruning operation determines that band 10 from the $L_1$ bands to be the least sequential, then only bands 10 and 14 from the $L_1$ bands are selected for merging with band 1 from $L_1$.

For a $L_1$-to-$L_1$ compaction, triggered by too many bands with overlapping key ranges in the level, the $L_1$ band that has the most overlaps is selected, as well as all the bands it overlaps. The disclosed technology then prunes the selected bands and determines the band that requires the most reordering (in other words, is the least sequential) among them. For example, the least sequential band and all $L_1$ bands that it overlaps are selected for the compaction run. Furthermore, because it is safe to select newer bands in $L_1$, all bands that are newer than the selected least sequential band may also be selected for compaction. For example, in FIG. 3, it is safe to select band 11 and not band 1 in $L_1$, but not vice-versa.

Multi-level organization may provide some amount of hot and cold data separation, where the upper levels contain hot data and lower levels contain cold data. An assumption may be that hot data in an upper level will be cleaned out in the upper levels, and will not travel down to lower levels. But the order in which compactions take place is unpredictable, and hot data in a level could very easily travel down to the lower level, even when it has been already invalidated in an upper level. Multi-level organization may also cause dead data to be duplicated multiple times, increasing both space and compaction overhead. Furthermore, multiple levels also easily split sequential data across multiple bands. Compared to multi-level organization, increasing the size threshold for $L_0$ provides the desired effect of hot and cold data separation with less overhead.

In one implementation, one or more hot data levels may be added between $L_0$ and $L_1$, with actual KV hotness prediction and hot KV movement between these levels. Hotness estimations provide more value in systems where the key space is limited and the users are forced to use/reuse the limited keys. But in a variable key length system, the users may avoid data movement themselves, by simply making better use of the available flexible key space.

Figure 4:
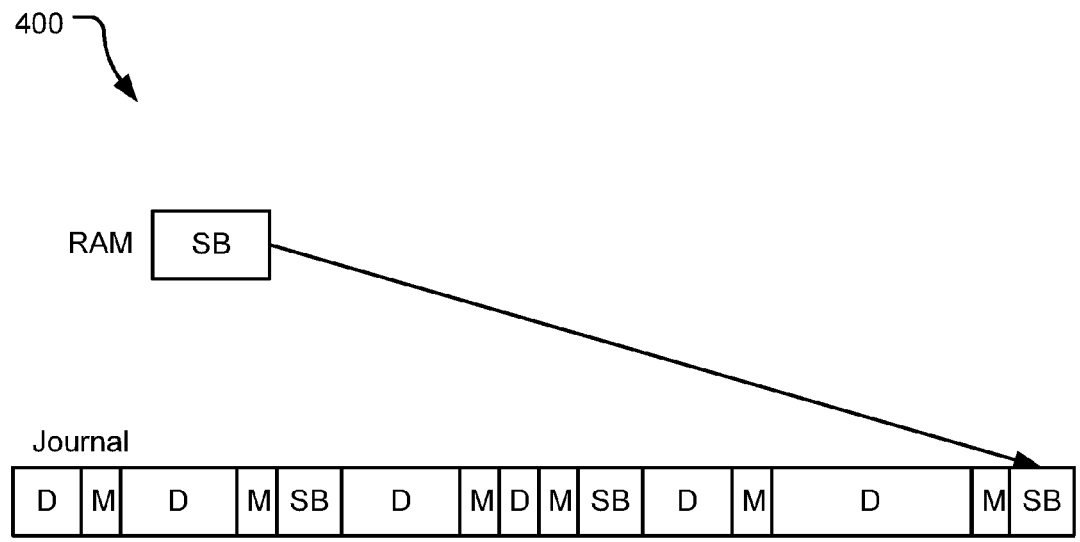
FIG. 4 illustrates an example level of a data store in an SMR drive.

FIG. 4 illustrates an example first level journal in a band 400 in the disclosed technology, which may be closed and reopened again anytime by writing superblock information to the end of the journal before closing and reading it back to memory from the end of the journal upon reopen. As shown in FIG. 4, a journal that has been closed and reopened multiple times may contain multiple versions of the SuperBlock (depicted as "SB") records mixed with the user Data (depicted as "D") and Metadata (depicted as "M") records, with the SB at the end of the journal being the latest superblock.

Figure 5:
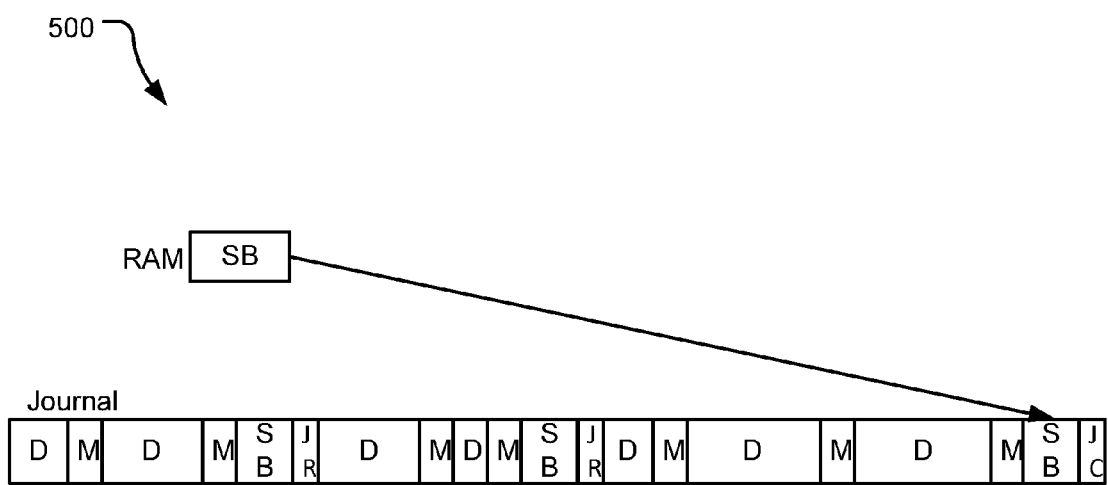
FIG. 5 illustrates a second example level of a data store in an SMR drive.

FIG. 5 illustrates a second example first level journal in a band 500. To denote the end of the journal and to detect an improper close, Journal Closed (depicted as "JC") and Journal Reopened (depicted as "JR") marker records are used. When a journal is closed, a JC will be added to the journal after the SB record. On reopening a journal, the JC will be replaced by a JR record. The end of the journal can be found when the journal is scanned and the JC record is encountered. If one is not found, an improper close is detected and the previous version of SB is retrieved from the most recent JR record.

Figure 6:
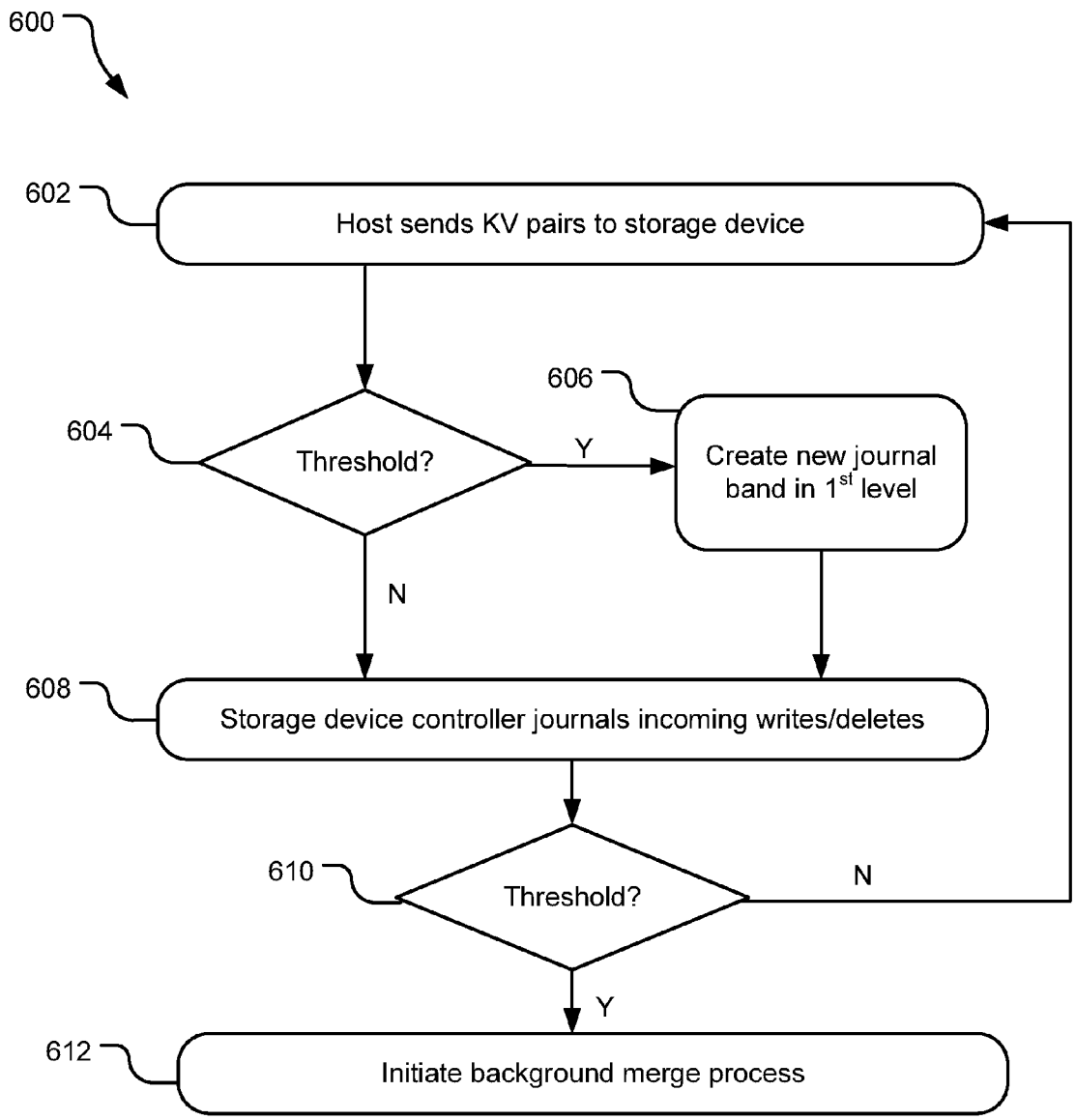
FIG. 6 illustrates example operations for storing data in a two-level KV data store.

In FIG. 6, example operations 600 for a two-level data store are shown. In operation 602, a host sends KV pairs to a storage device for journaling of incoming writes and deletes at first level journal bands (e.g., $L_0$ in FIG. 1). The capacity of a journal band in the storage device receiving the KV pairs is determined in a threshold operation 604. If the current journal band is not full, a storage device controller journals incoming writes and deletes in the operation 608.

If the current journal band is full, a new journal band is created in a first level in an operation 606. Then, a storage device controller journals incoming writes and deletes in an operation 608.

After operation 608, an operation 610 determines the capacity of journal bands in a level. If the number of journal bands in the first level does not meet the threshold, then the host can send more KV pairs to the storage device in an operation 602, and the operations commence again. If the threshold operation 610 determines that the number of journal bands in the first level meets the threshold, indicating that there are sufficient journal bands in the first level, a background merger process is initiated in an operation 612.

Figure 7:
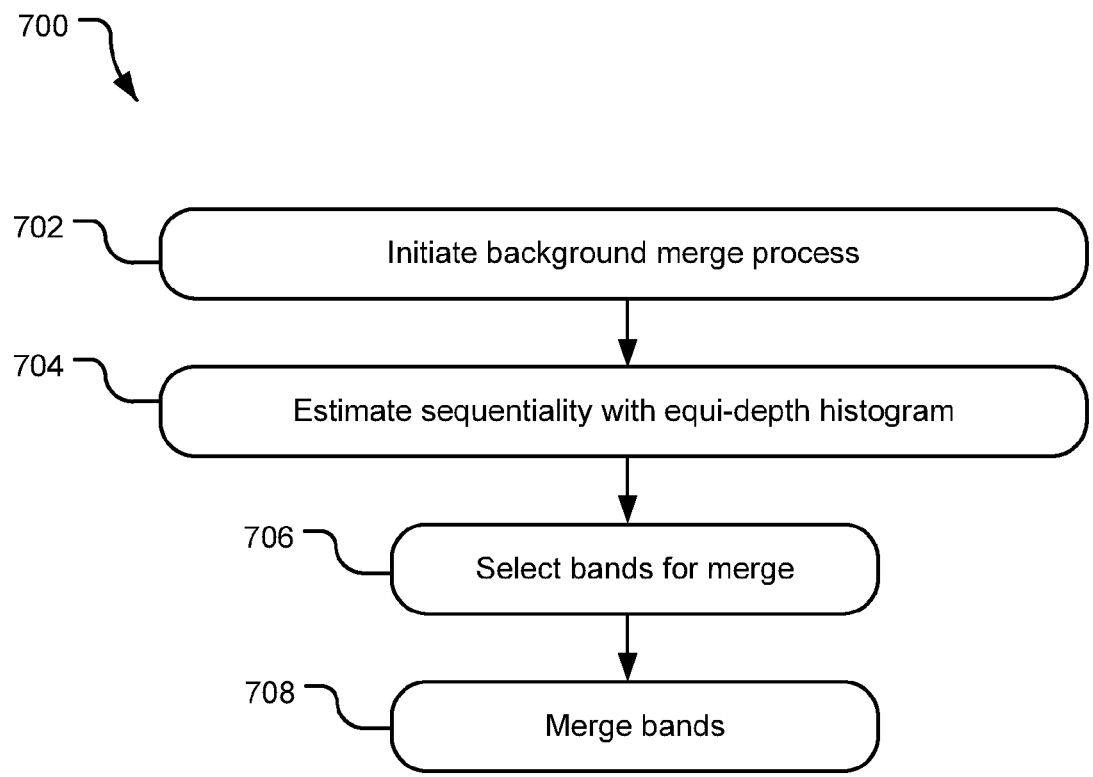
FIG. 7 illustrates example operations for a background merge process.

FIG. 7 illustrates example operations 700 in a background merger process. A background merger process commences in an operation 702. In an estimating operation 704, an equidepth histogram is used to estimate sequentiality of one or more of the bands at various levels. The bands requiring the most reordering for a merge process may be selected in a selecting operation 706. For example, this may include the oldest bands and/or overlapping bands. Subsequently, a merging operation 708 takes place, merging one or more first level bands with one or more higher level bands to form newly ordered higher level bands, which were previously selected in the selecting operation 706.

In addition to methods and systems, the embodiments of the technology described herein can be implemented as logical steps in one or more computer systems. The logical operations of the present technology can be implemented (1) as a sequence of processor-implemented steps executed in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method, comprising:
    storing data in a two level key-value data store in an SMR storage device, wherein a first level of the data store comprises a journal of incoming host operations and a second level of the data store comprises a plurality of ordered data stores ordered based on a predetermined ordering criterion.

2. The method of claim 1, wherein the predetermined ordering criterion is sequentiality of the plurality of ordered data stores.

3. The method of claim 1, wherein each of the plurality of ordered data stores belongs to an SMR band.

4. The method of claim 1, wherein each of the plurality of ordered data stores is separated by an existing key-space range.

5. The method of claim 1, further comprising merging at least one of a plurality of bands of the first level with at least one of a plurality of bands of the second level to form newly ordered second level bands.

6. The method of claim 5, wherein the merging is in response to a number of bands in the first level reaching a predetermined threshold.

7. The method of claim 6, further comprising selectively reordering one of more of the plurality of second level bands based on sequentiality of the one or more of the plurality of second level bands.

8. The method of claim 7, further comprising estimating the sequentiality of one or more of the plurality of second level bands using an equi-depth histogram.

9. The method of claim 1, further comprising selecting one or more of the plurality of first level bands for a compaction process.

10. The method of claim 9, wherein selecting one or more of the plurality of first level bands is based on estimating of bands that require the most reordering.

11. The method of claim 10, wherein estimating of bands that require the most reordering is based on selecting the oldest bands.

12. The method of claim 10, wherein estimating of bands that require the most reordering is based on selecting overlapping bands.

13. A system comprising:
    a storage media including a two level key-value data store including a first level and a second level, wherein the first level comprises a plurality of first level bands, each of the first level bands containing journals of incoming writes and deletes; and
    a storage controller configured to order a plurality of data stores at the second level and store data in the two level key-value data store.

14. The system of claim 13, wherein at least one of the two levels comprises at least one SMR band.

15. The system of claim 13, wherein the second level comprises a plurality of second level bands forming a single ordered data store.

16. The system of claim 15, wherein the single ordered data store further comprises a plurality of smaller data stores.

17. The system of claim 16, wherein the plurality of smaller data stores is partitioned by an existing key-space range.

18. The system of claim 13, wherein the storage controller is further configured to merge at least one of a plurality of bands of the first level with at least one of a plurality of bands of the second level to form newly ordered second level bands.

19. One or more computer-readable storage media encoding computer-executable instructions for executing on a computer system a computer process that reads only used shingled data tracks adjacent to a target track location, the computer process comprising:
    storing data in a two level key-value data store in an SMR storage device, wherein a first level of the data store comprises a journal of incoming host operations and a second level of the data store comprises a plurality of ordered data stores ordered based on a predetermined ordering criterion.

20. The one or more computer-readable storage media of claim 19, wherein the predetermined ordering criterion is sequentiality of the plurality of ordered data stores.

* * * * *